(12) United States Patent
Furukawa (10) Patent No.: US 9,407,181 B2
(45) Date of Patent: Aug. 2, 2016

(54) VEHICLE AND METHOD FOR CONTROLLING VEHICLE

(75) Inventor: Tomonori Furukawa, Toyota (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 1 day.

(21) Appl. No.: 14/131,474

(22) PCT Filed: Jul. 12, 2011

(86) PCT No.: PCT/JP2011/065865
§ 371 (c)(1),
(2), (4) Date: Jan. 8, 2014

(87) PCT Pub. No.: WO2013/008312
PCT Pub. Date: Jan. 17, 2013

(65) Prior Publication Data
US 2014/0152214 A1  Jun. 5, 2014

(51) Int. Cl.
*H02K 5/00* (2006.01)
*H02P 6/14* (2016.01)
*B60L 15/02* (2006.01)
*H02P 27/08* (2006.01)
*H02M 7/5387* (2007.01)

(52) U.S. Cl.
CPC ............. *H02P 6/142* (2013.01); *B60L 15/025* (2013.01); *H02M 7/53875* (2013.01); *H02P 27/085* (2013.01); *Y02T 10/643* (2013.01)

(58) Field of Classification Search
CPC ....... B60W 10/08; B60W 20/00; H02P 6/142; H02P 27/085; B60L 15/25; H02M 7/53875; Y02T 10/643
USPC ................. 318/801, 805, 400.13, 400.2, 599; 475/5; 477/20; 701/51
See application file for complete search history.

(56) References Cited

U.S. PATENT DOCUMENTS

| 7,898,208 | B2* | 3/2011 | Ochiai | H02M 7/53875 318/727 |
| 7,960,930 | B2* | 6/2011 | Sato | B60L 15/025 318/432 |
| 8,025,571 | B2* | 9/2011 | Cisneros | A63F 13/12 463/25 |
| 8,269,439 | B2* | 9/2012 | Itoh | H02M 7/00 318/400.02 |
| 8,427,087 | B2* | 4/2013 | Yamada | H02P 21/0021 318/400.02 |
| 8,497,645 | B2* | 7/2013 | Shimada | B60L 15/20 318/400.02 |

(Continued)

FOREIGN PATENT DOCUMENTS

JP   2007-143336   6/2007
JP   2007295649 A  11/2007

(Continued)

*Primary Examiner* — Rita Leykin
(74) *Attorney, Agent, or Firm* — Sughrue Mion, PLLC (57) ABSTRACT

A control device stores, as a dead time Td, a period from a point of time of a switching-off operation of an inverter to a point of time when an inverter output voltage becomes lower than a control target value "0". In overmodulation PWM control over the inverter, the control device performs the switching-off operation at a time t1, and thereafter starts a switching-on operation at a time t2 with passage of dead time Td read from a memory. With the setting of dead time Td, the inverter output voltage becomes lower than the control target value "0" at time t2 at which the switching-off operation is started. Hence, the inverter output voltage just after the switching-on operation is less likely to be affected by surge voltage during the switching-off operation, whereby the peak value of the inverter output voltage is made small.

5 Claims, 8 Drawing Sheets

(56) References Cited

U.S. PATENT DOCUMENTS

| | | | |
|---|---|---|---|
| 8,497,646 B2 * | 7/2013 | Yamada et al. | 318/400.09 |
| 8,502,493 B2 * | 8/2013 | Suhama | H02P 27/04 318/727 |
| 8,536,810 B2 * | 9/2013 | Yamada | H02P 27/04 318/400.09 |
| 8,639,405 B2 * | 1/2014 | Yamada | B60L 11/1803 180/65.285 |
| 8,666,580 B2 * | 3/2014 | Hashimoto | B60K 6/365 180/65.265 |
| 8,718,854 B2 * | 5/2014 | Hashimoto | B60K 6/445 701/22 |
| 2011/0080131 A1 | 4/2011 | Shimada et al. | |
| 2011/0187308 A1 | 8/2011 | Suhama et al. | |

FOREIGN PATENT DOCUMENTS

| | | |
|---|---|---|
| JP | 2008-022624 A | 1/2008 |
| JP | 2009-189173 | 8/2009 |
| JP | 2010-104151 A | 5/2010 |
| JP | 2011-067010 | 3/2011 |
| JP | 2011-083069 | 4/2011 |

* cited by examiner

| CONTROL METHOD | PWM: SINUSOIDAL WAVE PWM | OVERMODULATION PWM | RECTANGULAR WAVE (ONE PULSE) |
|---|---|---|---|
| | PWM CONTROL MODE | | RECTANGULAR WAVE VOLTAGE CONTROL MODE |
| WAVEFORM OF OUTPUT VOLTAGE OF INVERTER | FUNDAMENTAL WAVE COMPONENT | FUNDAMENTAL WAVE COMPONENT | FUNDAMENTAL WAVE COMPONENT |
| MODULATION FACTOR | APPROXIMATELY 0.61 | MAXIMAL VALUE IN SINUSOIDAL WAVE PWM TO 0.78 | 0.78 |
| CHARACTERISTIC | SMALL TORQUE FLUCTUATION | IMPROVED OUTPUT IN MIDDLE SPEED REGION | IMPROVED OUTPUT IN HIGH SPEED REGION |

VEHICLE AND METHOD FOR CONTROLLING VEHICLE

CROSS REFERENCE TO RELATED APPLICATIONS

This application is a National Stage of International Application No. PCT/JP2011/065865, filed Jul. 12, 2011, the contents of all of which are incorporated herein by reference in their entirety.

TECHNICAL FIELD

The present invention relates to a vehicle to which pulse width modulation (PWM) control is applied, as well as a method for controlling such a vehicle.

BACKGROUND ART

A driving method using an inverter has been employed to control an alternating-current motor using a direct-current power source. Switching of the inverter is controlled by an inverter driving circuit. For example, the alternating-current motor is fed with a voltage switched in accordance with PWM control.

Regarding such PWM control, Japanese Patent Laying-Open No. 2008-22624 (Patent Document 1) discloses a technique for preventing partial discharge from being likely to take place when a motor generator is operated under high-humidity environment, by setting a dead time to be longer than that in a normal state so as to relatively weaken an electric field generated in a gap of coil winding by surface charges.

CITATION LIST

Patent Document

PTD 1: Japanese Patent Laying-Open No. 2008-22624
PTD 2: Japanese Patent Laying-Open No. 2010-104151

SUMMARY OF INVENTION

Technical Problem

The PWM control can be divided into sinusoidal wave PWM control and overmodulation PWM control involving a higher modulation factor than that in the sinusoidal wave PWM control. In the overmodulation PWM control, a switching-off period (period from a point of time of a switching-off operation to a point of time of a next switching-on operation) during polarity inversion tends to be shorter than that in the sinusoidal wave PWM control. Hence, before surge voltage in the switching-off operation is attenuated, the next switching-on operation needs to be performed. Depending on a timing of the next switching-on operation, the surge voltage in the switching-off operation is superimposed on an inverter output voltage in the next switching-on operation, with the result that a peak value of the inverter output voltage (voltage to be applied to a motor) may become very high. However, none of Patent Documents 1 and 2 mentioned above describes such a problem and a solution for the problem.

The present invention has been made to solve the foregoing problem, and has an object to make the peak value of the inverter output voltage low in an overmodulation PWM control region.

Solution to Problem

A vehicle according to the present invention includes: a power controller that includes a switching element and that outputs a voltage in accordance with an operation of the switching element; and a control device that causes the output voltage of the power controller to come close to a control target value by controlling the operation of the switching element in accordance with pulse width modulation control. In an overmodulation region in which a modulation factor is higher than a predetermined value, the control device starts a switching-on operation of the switching element at a point of time when the output voltage becomes lower than the control target value after a switching-off operation of the switching element.

Preferably, after the switching-off operation of the switching element, the output voltage has an attenuating waveform that gradually converges toward the control target value. In the overmodulation region, the control device starts the switching-on operation of the switching element at a point of time when the output voltage corresponds to a minimum point of the attenuating waveform after the switching-off operation of the switching element.

Preferably, the control device starts the switching-on operation of the switching element at a point of time with passage of a predetermined period after the switching-off operation of the switching element. In the overmodulation region, the predetermined period is set in advance to be a period from the point of time of the switching-off operation of the switching element to the point of time when the output voltage becomes lower than the control target value.

Preferably, the vehicle further includes a motor. The power controller is an inverter that outputs a voltage to be applied to the motor.

A control method according to another aspect of the present invention is a method for controlling a vehicle including a power controller that includes a switching element and that outputs a voltage in accordance with an operation of the switching element, and a control device that causes the output voltage of the power controller to come close to a control target value by controlling the operation of the switching element in accordance with pulse width modulation control. The method includes the steps of: performing a switching-off operation of the switching element in an overmodulation region in which a modulation factor is higher than a predetermined value; and starting a switching-on operation of the switching element at a point of time when the output voltage becomes lower than the control target value after the switching-off operation of the switching element.

Advantageous Effects of Invention

According to the present invention, the peak value of the inverter output voltage in the overmodulation PWM control region can be made low.

DESCRIPTION OF EMBODIMENTS

The following describes an embodiment of the present invention in detail with reference to figures. It should be noted that the same reference characters in the figures indicate the same or corresponding portions.

Figure 1:
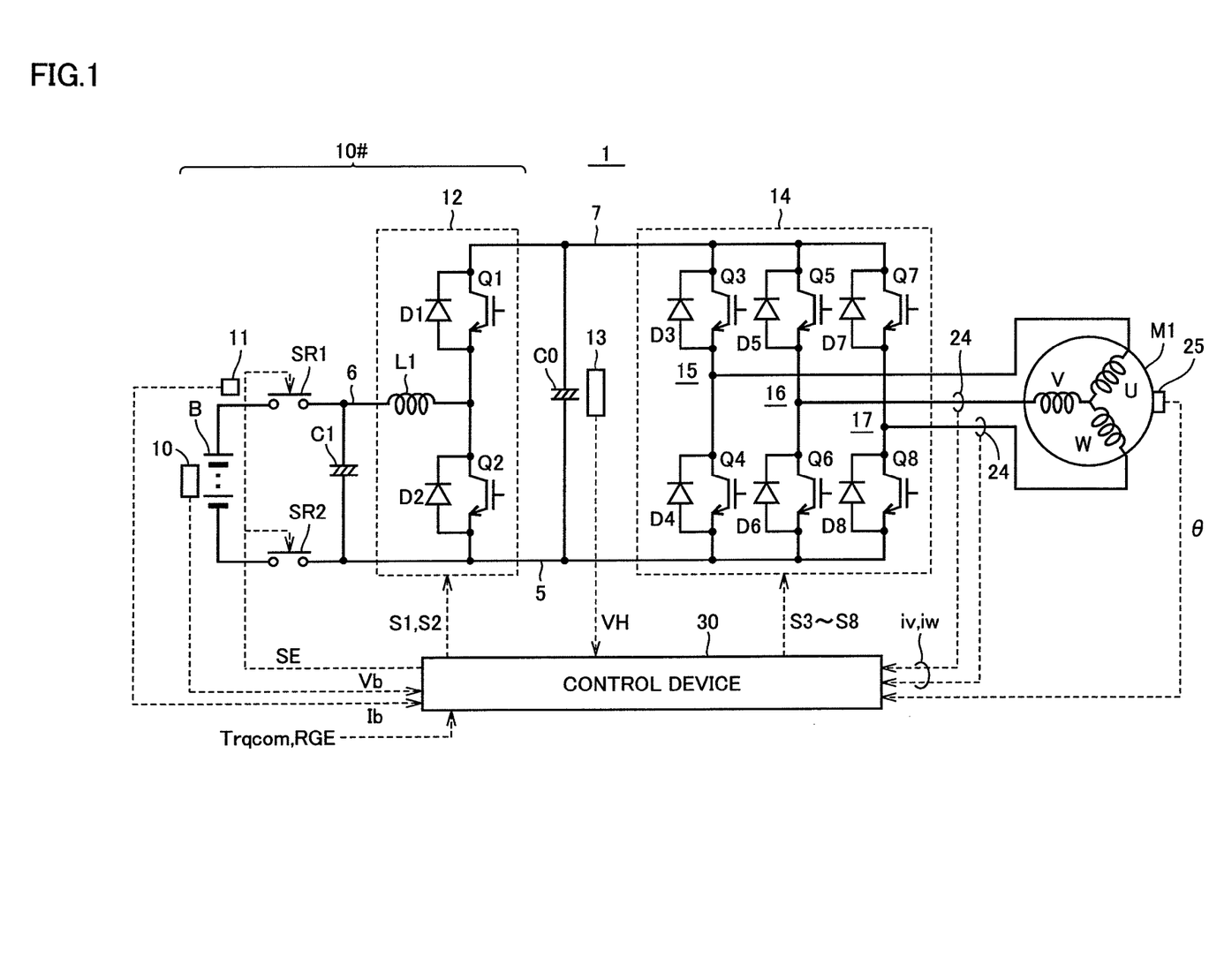
FIG. 1 is an entire configuration diagram of a vehicle.

FIG. 1 is an entire configuration diagram of a vehicle 1 according to an embodiment of the present invention.

Referring to FIG. 1, vehicle 1 includes a direct-current voltage generating unit 10#, a smoothing capacitor C0, an inverter 14, an alternating-current motor M1, and a control device 30.

Vehicle 1 is a vehicle employing electric energy to generate vehicle driving power, such as a hybrid vehicle, an electric vehicle, or a fuel cell vehicle.

Alternating-current motor M1 is a driving motor for generating torque to drive a driving wheel of vehicle 1. Alternatively, alternating-current motor M1 may be configured to have a function of a power generator driven by an engine, and may be configured to have functions of both a motor and a power generator. Further, alternating-current motor M1 may operate as a motor for the engine and may be incorporated in a hybrid vehicle as a component capable of starting the engine, for example. In other words, the alternating-current motor in the present embodiment includes an alternating-current driven motor, a power generator, and a motor generator.

Direct-current voltage generating unit 10# includes a direct-current power source B, system relays SR1, SR2, a smoothing capacitor C1, and a converter 12.

Direct-current power source B is constructed of a nickel hydrogen or lithium ion secondary battery, or a power storage device such as an electric double layer capacitor, representatively. Direct-current power source B outputs a direct-current voltage Vb and receives and sends a direct-current Ib, which are detected by a voltage sensor 10 and a current sensor 11 respectively.

System relay SR1 is connected between the positive electrode terminal of direct-current power source B and a power line 6, whereas system relay SR2 is connected between the negative electrode terminal of direct-current power source B and an earth line 5. Each of system relays SR1, SR2 is turned on/off in response to a signal SE from control device 30.

Converter 12 includes a reactor L1, power semiconductor switching elements Q1, Q2, and diodes D1, D2. Power semiconductor switching elements Q1 and Q2 are connected between a power line 7 and earth line 5 in series. Turning on/off power semiconductor switching elements Q1 and Q2 is controlled by means of switching control signals S1 and S2 supplied from control device 30.

In the embodiment of the present invention, an IGBT (Insulated Gate Bipolar Transistor), a power MOS (Metal Oxide Semiconductor) transistor, a power bipolar transistor, or the like can be used as each of the power semiconductor switching elements (hereinafter, each simply referred to as "switching element"). Anti-parallel diodes D1, D2 are provided for switching elements Q1, Q2 respectively. Reactor L1 is connected between a connection node of switching elements Q1, Q2 and power line 6. Further, smoothing capacitor C0 is connected between power line 7 and earth line 5.

Inverter 14 includes U-phase upper/lower arms 15, V-phase upper/lower arms 16, and W-phase upper/lower arms 17, which are provided in parallel between power line 7 and earth line 5. Each of the upper/lower arms of the phases includes switching elements connected between power line 7 and earth line 5 in series. For example, U-phase upper/lower arms 15 include switching elements Q3, Q4 respectively. V-phase upper/lower arms 16 include switching elements Q5, Q6 respectively. W-phase upper/lower arms 17 include switching elements Q7, Q8 respectively. Further, anti-parallel diodes D3-D8 are connected to switching elements Q3-Q8 respectively. Turning on/off switching elements Q3-Q8 is controlled by means of switching control signals S3-S8 supplied from control device 30.

Typically, alternating-current motor M1 is a three-phase permanent magnet synchronous motor, and is configured to have three coils of the U, V, W phases, each having one end connected to a neutral point commonly. Each of the phase coils has the other end connected to the intermediate point of the switching elements of each of upper/lower phase arms 15-17.

In a step-up operation, converter 12 steps up a direct-current voltage Vb supplied from direct-current power source B to obtain a direct-current voltage VH, which corresponds to a voltage input to inverter 14 and is hereinafter also referred to as "system voltage", and supplies it to inverter 14. More specifically, in response to switching control signals S1, S2 from control device 30, a period during which switching element Q1 is on and a period during which switching element Q2 is on (or a period during which both switching elements Q1, Q2 are off) are provided to come alternately. A step-up ratio is in accordance with the ratio of these on periods. Alternatively, when switching elements Q1 and Q2 are respectively fixed to be on and off, VH=Vb (step-up ratio=1.0) can be set.

On the other hand, in a step-down operation, converter 12 steps down direct-current voltage VH (system voltage) supplied from inverter 14 via smoothing capacitor C0 to charge direct-current power source B. More specifically, in response to switching control signals S1, S2 from control device 30, a period during which only switching element Q1 is on, and a period during which both switching elements Q1, Q2 are off (or on period of switching element Q2) are provided to come alternately. A step-down ratio is in accordance with the duty ratio of the foregoing on periods.

Smoothing capacitor C0 smoothes the direct-current voltage supplied from converter 12, and supplies the smoothed direct-current voltage to inverter 14. A voltage sensor 13 detects the voltage across smoothing capacitor C0, i.e., system voltage VH, and sends the detected value thereof to control device 30.

When the torque command value of alternating-current motor M1 is positive (Trqcom>0) and a direct-current voltage is supplied from smoothing capacitor C0, inverter 14 converts the direct-current voltage into an alternating-current voltage by means of switching operations of switching elements Q3-Q8 responding to switching control signals S3-S8 from control device 30, so as to drive alternating-current motor M1 to output a positive torque. Meanwhile, when the torque command value for alternating-current motor M1 has a value of 0 (Trqcom=0), inverter 14 converts the direct-current voltage into an alternating-current voltage by means of switching operations responding to switching control signals S3-S8 and drives alternating-current motor M1 to obtain a torque of 0. In this way, alternating-current motor M1 is driven to generate a torque of 0 or of a positive value as designated by torque command value Trqcom.

Furthermore, upon regenerative braking of vehicle 1, torque command value Trqcom of alternating-current motor M1 is set to a negative value (Trqcom<0). In this case, by means of switching operations responding to switching signals S3-S8, inverter 14 converts an alternating-current voltage generated by alternating-current motor M1 into a direct-current voltage, and supplies the converted direct-current voltage (system voltage) to converter 12 via smoothing capacitor C0. It should be noted that the term "regenerative braking" as described herein includes: braking involving regenerative power generation resulting from manipulation of the foot brake pedal by a driver who drives an electrically powered vehicle; and vehicular speed reduction (or stop of acceleration) involving regenerative power generation achieved by easing off the accelerator pedal during traveling without manipulating the foot brake pedal.

Current sensors 24 detect motor currents flowing in alternating-current motor M1, and notify control device 30 of the detected motor currents. The sum of the instantaneous values of three phase currents iu, iv, iw is zero. Hence, it is sufficient to dispose current sensors 24 to detect motor currents for two phases (for example, V-phase current iv and W-phase current iw) as shown in FIG. 1.

A rotational angle sensor (resolver) 25 detects a rotor rotational angle θ of alternating-current motor M1, and notifies control device 30 of rotational angle θ thus detected. Control device 30 can calculate the rotation rate (rotation speed) and angular velocity ω (rad/s) of alternating-current motor M1 based on rotational angle θ. It should be noted that rotational angle sensor 25 may not be provided when control device 30 directly finds rotational angle θ from the motor voltage and current.

Control device 30, which is constructed of an electronic control unit (ECU), controls operations of vehicle 1 by means of a software process implemented by executing a program stored in advance by a CPU not shown in the figures and/or a hardware process implemented by a dedicated electronic circuit.

As a representative function, control device 30 controls operations of converter 12 and inverter 14 using a below-described control method based on input torque command value Trqcom, direct-current voltage Vb detected by voltage sensor 10, direct-current Ib detected by current sensor 11, system voltage VH detected by voltage sensor 13, motor currents iv, iw detected by current sensors 24, rotational angle θ detected by rotational angle sensor 25, and the like, so as to allow alternating-current motor M1 to output a torque according to torque command value Trqcom. In other words, control device 30 generates switching control signals S1-S8 to control converter 12 and inverter 14 in the manner described above, and sends them to converter 12 and inverter 14.

In the step-up operation of converter 12, control device 30 controls system voltage VH through feedback to generate switching control signals S1, S2 so that system voltage VH has a value equal to the voltage command value.

Further, when control device 30 receives from the external ECU a signal RGE indicating that the electrically powered vehicle has entered the regenerative braking mode, control device 30 generates switching control signals S3-S8 to convert the alternating-current voltage generated by alternating-current motor M1 into a direct-current voltage, and outputs them to inverter 14. Accordingly, inverter 14 converts the alternating-current voltage generated by alternating-current motor M1 into the direct-current voltage and supplies it to converter 12.

Furthermore, when control device 30 receives from the external ECU signal RGE indicating that the electrically powered vehicle has entered the regenerative braking mode, control device 30 generates switching control signals S1, S2 to step down the direct-current voltage supplied from inverter 14, and outputs them to converter 12. Accordingly, the alternating-current voltage generated by alternating-current motor M1 is converted into a direct-current voltage, which is then stepped down and is supplied to direct-current power source B.

The following describes control over alternating-current motor M1 by control device 30 more in detail.

Figure 2:
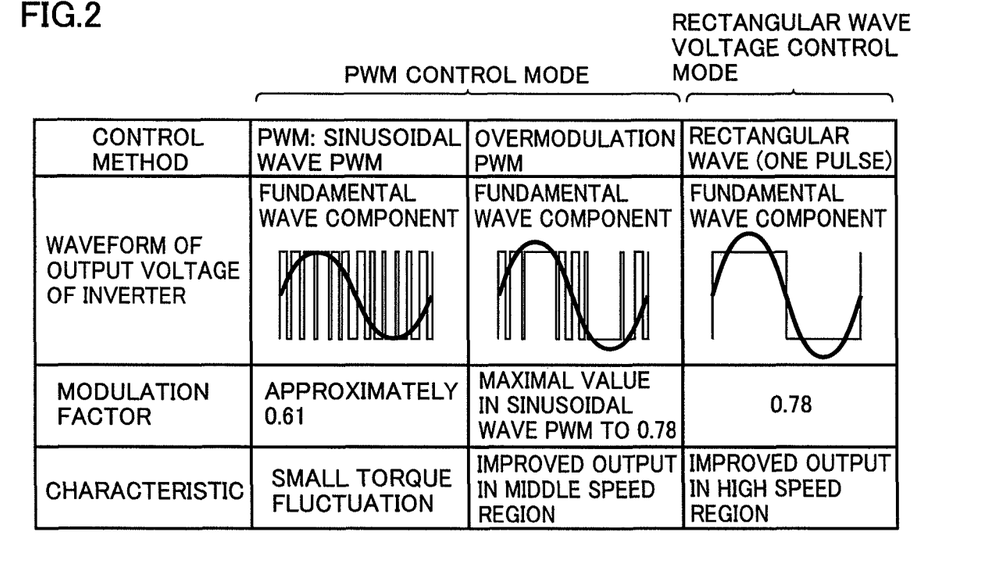
FIG. 2 schematically illustrates control modes of an alternating-current motor.

FIG. 2 schematically illustrates control modes for alternating-current motor M1 in vehicle 1 according to the present embodiment.

As shown in FIG. 2, in vehicle 1 according to the present embodiment, three control modes are utilized and are switched thereamong for control for alternating-current motor M1, i.e., power conversion in inverter 14.

Sinusoidal wave PWM control is utilized as general PWM control, and is to control the upper/lower arm elements of each phase to turn on/off, in accordance with a comparison of voltage between a voltage command having a sinusoidal waveform and a carrier wave (a triangular wave, representatively). As a result, a duty is controlled so that the fundamental wave component is a sinusoidal wave during a certain period in a set of a high level period and a low level period. The high level period corresponds to an on period of the upper arm element whereas the low level period corresponds to an on period of the lower arm element. As known well, in the sinusoidal wave PWM control, the amplitude of the voltage command having a sinusoidal waveform is limited to a range of not more than the amplitude of the carrier wave, and the fundamental wave component of the voltage (hereinafter, also simply referred to as "motor applied voltage") to be applied to alternating-current motor M1 can be increased to be greater only by approximately 0.61 times than the direct-current link voltage of the inverter. Hereinafter, in the present specification, a ratio of the fundamental wave component (effective value) of the motor applied voltage (line voltage) to the direct-current link voltage of inverter 14 (i.e., system voltage VH) is referred to as "modulation factor".

In the sinusoidal wave PWM control, the amplitude of the voltage command of a sinusoidal wave falls within the range of not more than the amplitude of the carrier wave. Hence, the line voltage applied to alternating-current motor M1 represents a sinusoidal wave.

Overmodulation PWM control is to perform PWM control similar to that in the sinusoidal wave PWM control, in a range in which the amplitude of the voltage command (sinusoidal wave component) is larger than the amplitude of the carrier wave. In particular, the voltage command, which originally has a sinusoidal waveform, is distorted (amplitude correction) to increase the fundamental wave component. In this way, the modulation factor can be increased up to a range from the maximal modulation factor in the sinusoidal wave PWM control mode to 0.78. In the overmodulation PWM control, the amplitude of the voltage command (sinusoidal wave component) is larger than that of the carrier wave, so the line voltage applied to alternating-current motor M1 is not a voltage of a sinusoidal wave but a distorted voltage.

On the other hand, in rectangular wave voltage control, during the above-described certain period, the alternating-current motor is fed with one pulse of a rectangular wave in which a ratio of the high level period and the low level period is 1:1. This increases the modulation factor up to 0.78.

In alternating-current motor M1, increase in the rotation speed or the output torque causes increased induced voltage. Accordingly, required driving voltage (motor required voltage) is high. The step-up voltage provided by converter 12, i.e., system voltage VH needs to be set higher than this motor required voltage. On the other hand, the step-up voltage provided by converter 12, i.e., system voltage VH has a limit value (VH maximal voltage).

Thus, in accordance with an operation state of alternating-current motor M1, one of the PWM control modes and the rectangular wave voltage control mode is selectively applied. The PWM control modes employ the sinusoidal wave PWM control or the overmodulation PWM control to control the amplitude and phase of the motor applied voltage (alternating current) through feedback of the motor current. In the rectangular wave voltage control, the amplitude of the motor applied voltage is fixed. Hence, the torque is controlled through phase control for the pulse of the rectangular wave voltage, based on a deviation between the torque actual value and the torque command value.

Figure 3:
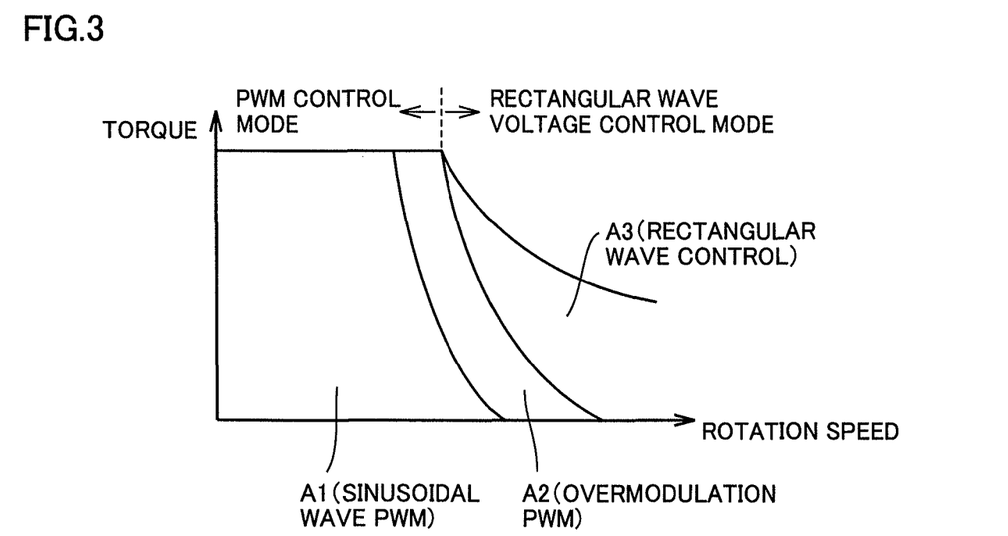
FIG. 3 shows a correspondence between an operation state of the alternating-current motor and each of the control modes.

FIG. 3 shows a correspondence between operating states of alternating-current motor M1 and the above-described control modes.

Referring to FIG. 3, schematically, the sinusoidal wave PWM control is used in a low rotation speed region A1 to reduce fluctuation of torque, the overmodulation PWM control is applied in a middle rotation speed region A2, and the rectangular wave voltage control is applied in a high rotation speed region A3. In particular, the overmodulation PWM control and the rectangular wave voltage control thus applied allow for improved output of alternating-current motor M1. As such, which one of the control modes shown in FIG. 2 is used is determined within a range of an implementable modulation factor, basically.

Figure 4:
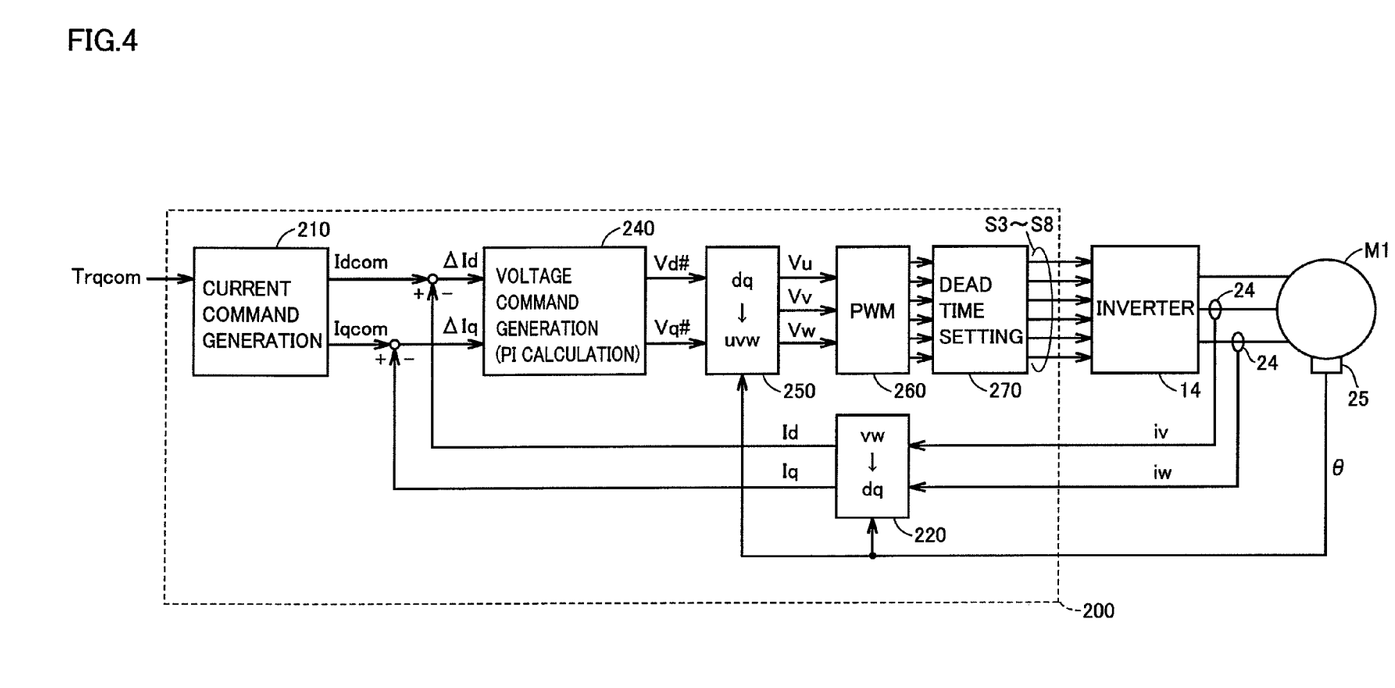
FIG. 4 is a function block diagram of a control device.

FIG. 4 is a function block diagram of portions associated with the PWM control (sinusoidal wave PWM control and overmodulation PWM control) of control device 30. Each of functional blocks shown in FIG. 4 may be implemented by hardware or software.

Referring to FIG. 4, the PWM control is performed by a PWM control unit 200 included in control device 30. PWM control unit 200 includes a current command generating unit 210, coordinate conversion units 220, 250, a voltage command generating unit 240, a PWM modulation unit 260, and a dead time setting unit 270.

Current command generating unit 210 generates a d-axis current command value Idcom and a q-axis current command value Iqcom each corresponding to torque command value Trqcom of alternating-current motor M1, in accordance with a table or the like prepared in advance.

Coordinate conversion unit 220 performs coordinate conversion (from three phases to two phases) using rotational angle θ of alternating-current motor M1 detected by rotational angle sensor 25 so as to calculate a d-axis current Id and a q-axis current Iq based on V-phase current iv and W-phase current iw detected by current sensors 24.

Current command generating unit 240 receives a deviation ΔId (ΔId=Idcom−Id) of the d-axis current from the command value and a deviation ΔIq (ΔIq=Iqcom−Iq) of the q-axis current from the command value. Current command generating unit 240 performs PI (proportional integral) calculation of each of d-axis current deviation ΔId and q-axis current deviation ΔIq with a predetermined gain so as to determine a control deviation, and generates a d-axis voltage command value Vd# and a q-axis voltage command value Vq# based on this control deviation.

Coordinate conversion unit 250 performs coordinate conversion (two phases to three phases) using rotational angle θ of alternating-current motor M1, so as to convert d-axis voltage command value Vd# and q-axis voltage command value Vq# into U-phase, V-phase, W-phase voltage commands Vu, Vv, Vw.

PWM modulation unit 260 generates switching control signals to control on/off of the upper/lower arm elements of each phase of inverter 14, based on a comparison between a carrier wave (carrier signal wave) formed of a triangular wave or saw-tooth wave of a predetermined frequency and each of phase voltage commands Vu, Vv, Vw.

Figure 5:
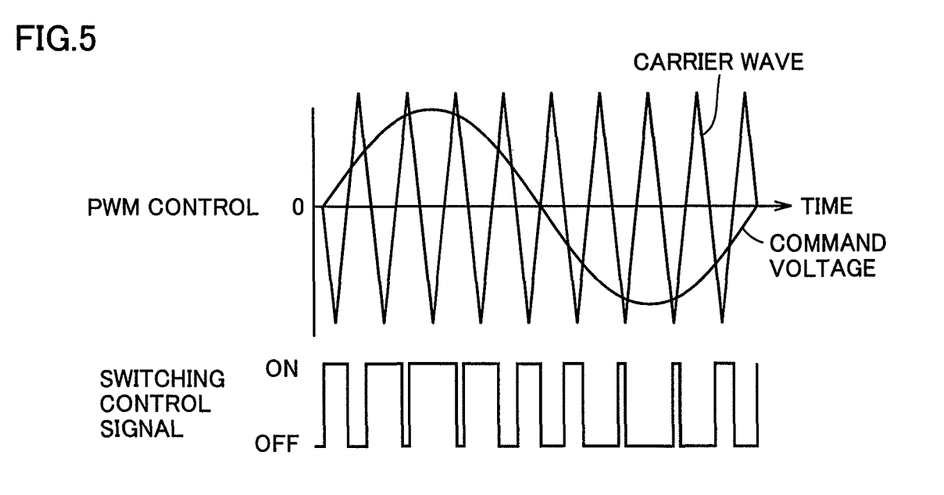
FIG. 5 shows one example of each of waveforms of carrier waves, voltage commands, and switching control signals.

FIG. 5 shows one example of each of waveforms (for one phase) of the carrier waves, the voltage commands, and the switching control signals. In the example shown in FIG. 5, when the voltage command is larger than the carrier wave, the switching control signal is turned on to result in a switching-on period. Otherwise, the switching control signal is turned off to result in a switching-off period.

Turning back to FIG. 4, dead time setting unit 270 sets a dead time Td for each of the switching control signals, generated by PWM modulation unit 260, of the phases. Dead time Td is a period during which the upper/lower arm elements of each phase of inverter 14 are both off.

After setting the dead time, dead time setting unit 270 sends switching control signals S3 to S8 to inverter 14.

Inverter 14 is controlled to be switched in accordance with switching control signals S3 to S8 after setting the dead time, and accordingly sends a pseudo-sinusoidal wave voltage corresponding to torque command value Trqcom to each phase of alternating-current motor M1. In this way, a torque according to torque command value Trqcom is output from alternating-current motor M1. In the description below, the pseudo-sinusoidal wave voltage sent from inverter 14 to alternating-current motor M1 will be also referred to as "inverter output voltage".

In the case where the overmodulation PWM control involving a modulation factor higher than that in the sinusoidal wave PWM control is performed in vehicle 1 configured as described above, a higher surge voltage may be superimposed on the inverter output voltage than that in the sinusoidal wave PWM control.

Figure 6:
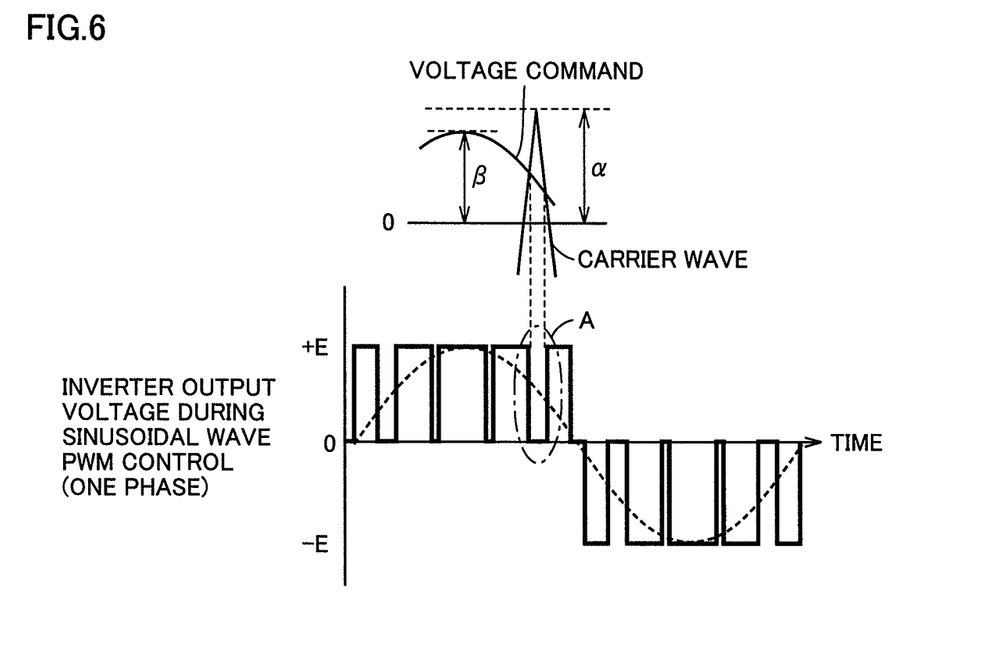
FIG. 6 shows a waveform of an inverter output voltage during sinusoidal wave PWM control.

FIG. 6 shows a waveform of the inverter output voltage (for one phase) during the sinusoidal wave PWM control. Control device 30 controls the switching operation of inverter 14 in accordance with a result of comparison between the carrier wave and the voltage command as described above. Accordingly, the inverter output voltage becomes "E" (strictly "+E" or "−E") during the switching-on period as shown in FIG. 6, and becomes "0" during the switching-off period. Specifically, control device 30 sets a control target value (intended control value) of the inverter output voltage to be "E" (strictly "+E" or "−E") in the switching-on period, and sets the control target value of the inverter output voltage to be "0" in the switching-off period. Control device 30 controls the switching operation of inverter 14 such that the actual inverter output voltage comes close to each of these control target values. With this, the inverter output voltage becomes a pseudo-sinusoidal wave voltage periodically changing between "E" and "0".

During the sinusoidal wave PWM control, the carrier wave has an amplitude α larger than an amplitude β of the voltage command. Hence, in the sinusoidal wave PWM control, the switching-off period is relatively long (see portion A in FIG. 6).

Figure 7:
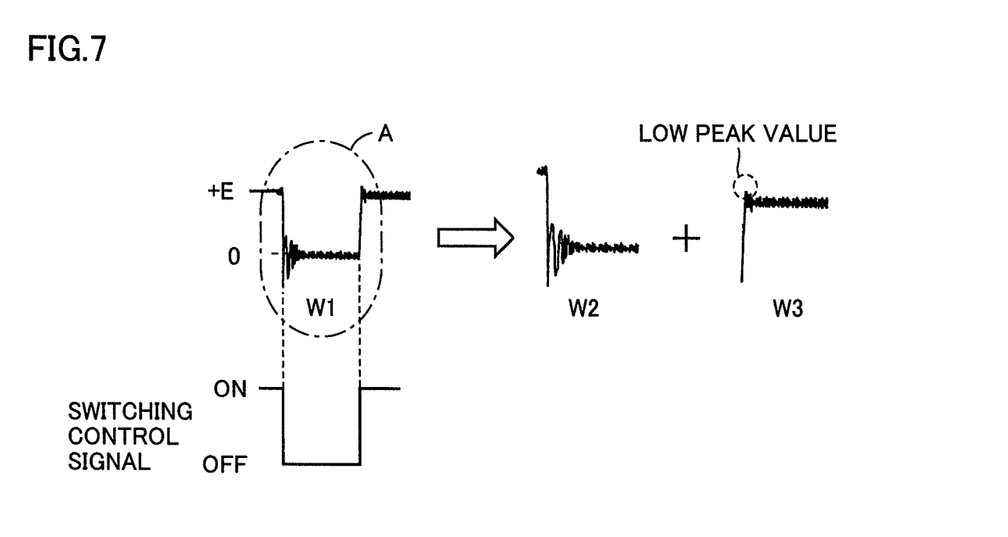
FIG. 7 is an enlarged view of a portion of the waveform of the inverter output voltage during the sinusoidal wave PWM control.

FIG. 7 is an enlarged view of the portion (portion A in FIG. 6) of the waveform of the inverter output voltage during the sinusoidal wave PWM control. A waveform W1 of the inverter output voltage during the sinusoidal wave PWM control is formed of a waveform W2 upon and after the switching-off operation and a waveform W3 upon and after the switching-on operation.

As indicated by waveform W2 in FIG. 7, just after the switching-off operation (just after the switching control signal is changed from the on state to the off state), a relatively high surge voltage is instantaneously superimposed on the inverter output voltage. This surge voltage is gradually attenuated. Accordingly, the waveform of the inverter output voltage upon and after the switching-off operation is an attenuating waveform that gradually converges toward "0", which is the control target value during the switching-off period.

Here, in the sinusoidal wave PWM control, the switching-off period is relatively long as described above. Accordingly, the switching-on operation can be started after the inverter output voltage substantially converges to the control target value "0". Hence, the peak value of the inverter output voltage just after the switching-on operation is relatively low (see waveform W3).

In contrast, in the overmodulation PWM control, the switching-off period is much shorter than the switching-off period in the sinusoidal wave PWM control, with the result that the peak value of the inverter output voltage just after the switching-on operation may become very high.

Figure 8:
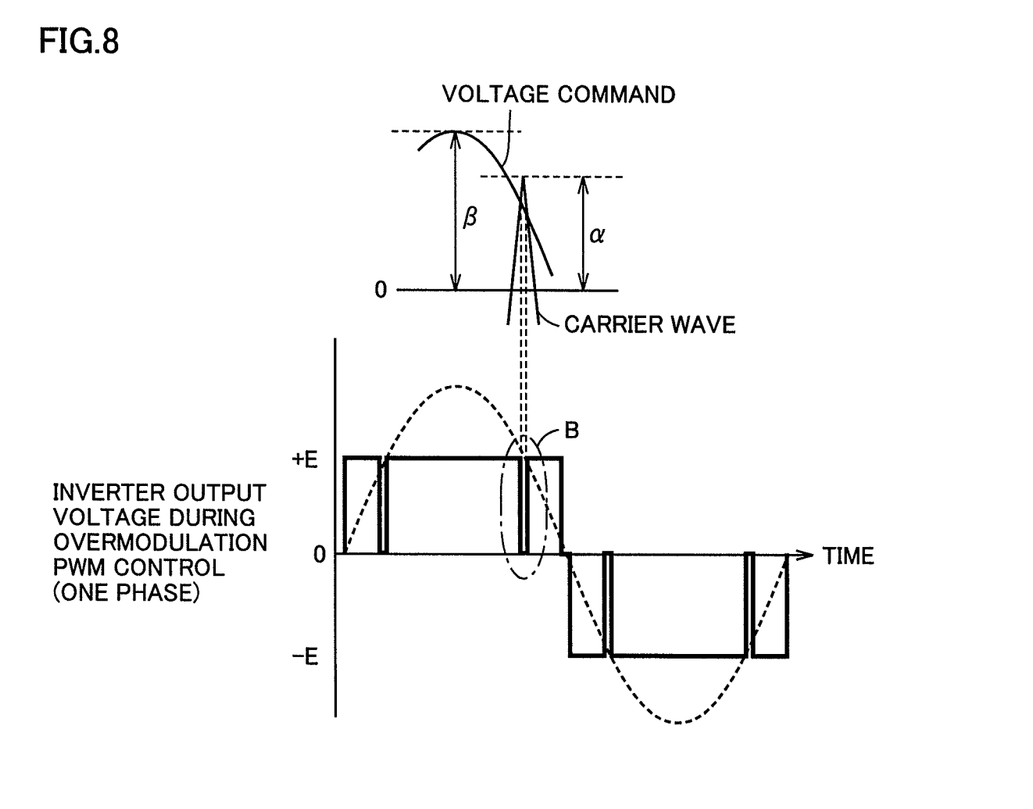
FIG. 8 shows each waveform of the inverter output voltage during the overmodulation PWM control.

FIG. 8 shows each waveform of the inverter output voltage (for one phase) during the overmodulation PWM control. During the overmodulation PWM control, the modulation factor is increased such that amplitude β of the voltage command becomes larger than amplitude α of the carrier wave. Accordingly, the switching-off period becomes much shorter than that in the sinusoidal wave PWM control (see a portion B in FIG. 8). This phenomenon is noticeable particularly in a region (region close to the rectangular wave control region) having a particularly high modulation factor in the overmodulation PWM control region.

Figure 9:
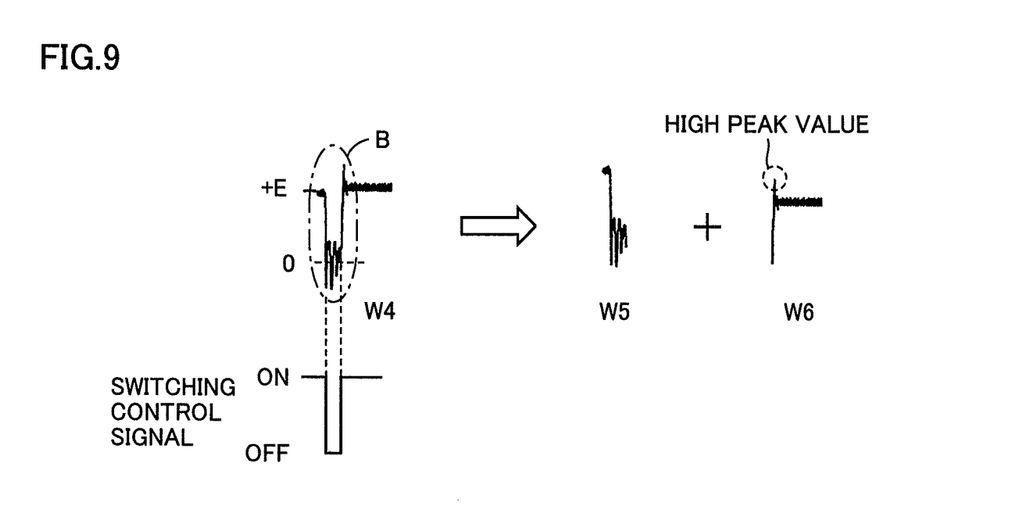
FIG. 9 is an enlarged view of a portion of the waveform of the inverter output voltage during the overmodulation PWM control.

FIG. 9 is an enlarged view of the portion (portion B in FIG. 8) of the waveform of the inverter output voltage during the overmodulation PWM control. A waveform W4 of the inverter output voltage during the overmodulation PWM control is formed of a waveform W5 upon and after the switching-off operation and a waveform W6 upon and after the switching-on operation.

As indicated by waveform W5 in FIG. 9, also during the overmodulation PWM control, a high surge voltage is instantaneously superimposed on the inverter output voltage just after the switching-off operation, and the inverter output voltage thereafter gradually converges toward the control target value "0" as with the sinusoidal wave PWM control. However, in the overmodulation PWM control, the switching-off period is very short as described above. Accordingly, the switching-on operation needs to be started before the inverter output voltage converges to the control target value "0". Hence, depending on a start timing of the switching-on operation, the inverter output voltage just after the switching-on operation may have a very high peak value due to an influence of the surge voltage during the switching-off operation (see waveform W6 in FIG. 9).

To address this, in the overmodulation PWM control, control device 30 according to the present embodiment starts the switching-on operation at a point of time when the inverter output voltage becomes lower than the control target value "0" after the switching-off operation. Specifically, dead time setting unit 270 sets dead time Td for the overmodulation PWM control so as to start the switching-on operation at a point of time when the inverter output voltage becomes lower than the control target value "0" after the switching-off operation. In this way, the peak value of the inverter output voltage in the overmodulation PWM control region can be made low, thereby reducing the surge voltage to be applied to the motor.

It should be noted that in the present invention, the expression "the inverter output voltage becomes lower than the control target value '0'" is intended to indicate that assuming the control target value "E" as a reference in the switching-on period, the inverter output voltage is further away from the control target value "E" relative to the control target value "0". Hence, the expression "the inverter output voltage becomes lower than the control target value '0'" is intended to indicate that the inverter output voltage has a negative value when the control target value in the switching-on period is "+E", whereas the inverter output voltage has a positive value when the control target value in the switching-on period is "−E".

Figure 10:
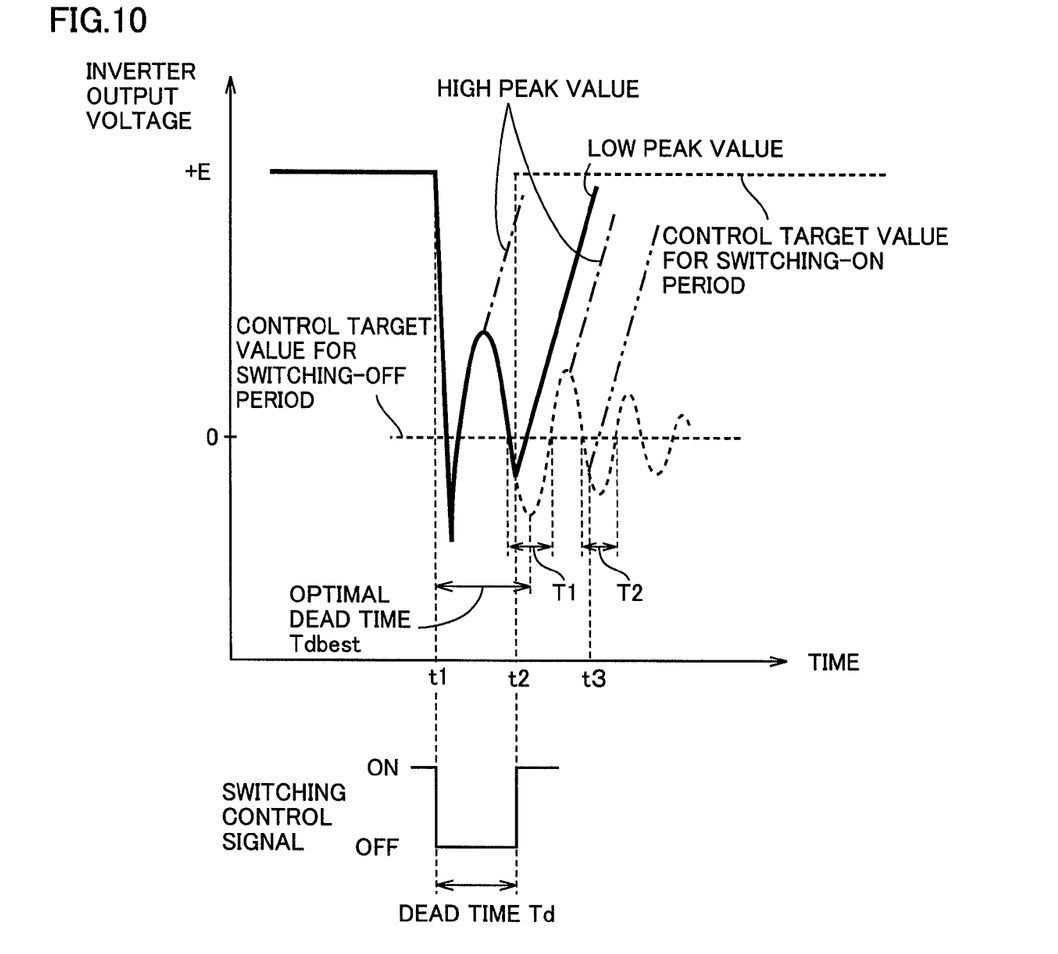
FIG. 10 shows a correspondence between a dead time Td for the overmodulation PWM control and the waveform of the inverter output voltage.

FIG. 10 shows a correspondence between dead time Td for the overmodulation PWM control and the waveform of the inverter output voltage.

Control device 30 starts the switching-on operation at a time t2 with passage of dead time Td after the switching-off operation is performed at a time t1.

Here, in the present embodiment, dead time Td is set to be a period from the point of time of the switching-off operation to the point of time when the inverter output voltage becomes lower than the control target value "0". For example, the period from the point of time of the switching-off operation to the point of time when the inverter output voltage becomes lower than the control target value "0" is found in advance by an experiment or the like, and the period thus found is recorded in a memory in advance as dead time Td. In the overmodulation PWM control, dead time setting unit 270 reads dead time Td from the memory and sets it. It should be noted that the frequency of the attenuating waveform of the inverter output voltage is determined by an inductance component of reactor L1 of converter 12, a capacitance component of smoothing capacitor C0, and the like. Hence, dead time Td can be set in view of these.

By setting dead time Td in this way, at time t2 at which the switching-off operation is started, as shown in FIG. 10, the inverter output voltage becomes lower than the control target value "0" (the inverter output voltage is further away from the control target value "E" relative to the control target value "0"). Accordingly, the inverter output voltage just after the switching-on operation is less likely to be affected by surge voltage during the switching-off operation, whereby the peak value of the inverter output voltage is made small.

In the conventional technique, dead time Td is not required to be set as described in the present embodiment. Accordingly, for example, the switching-on operation may be started at the point of time when the attenuating waveform of the inverter output voltage becomes higher than the control target value "0" (when the inverter output voltage comes closer to control target value "E" relative to control target value "0") as indicated by an alternate long and short dash line, with the result that the peak value of the inverter output voltage may become very high. In the present embodiment, such a problem can be prevented in advance.

It should be noted that dead time Td is not limited to the one shown in FIG. 10. For example, when a period from a point of time of the switching-off operation to a point of time when the attenuating waveform of the inverter output voltage becomes minimum (for example, optimal dead time Tdbest shown in FIG. 10) is set as dead time Td, the peak value of the inverter output voltage can become the smallest value. Accordingly, dead time Td may be set to attain this optimal dead time Tdbest.

Further, a point of time of end of dead time Td may be appropriately changed within a period during which the attenuating waveform of the inverter output voltage becomes lower than the control target value "0" (for example, within a period T1 or a period T2 in FIG. 10). For example, as indicated by a chain double-dashed line of FIG. 10, the point of time of end of dead time Td may be set at a time t3 included in period T2 and the switching-on operation may be started at time t3.

Figure 11:
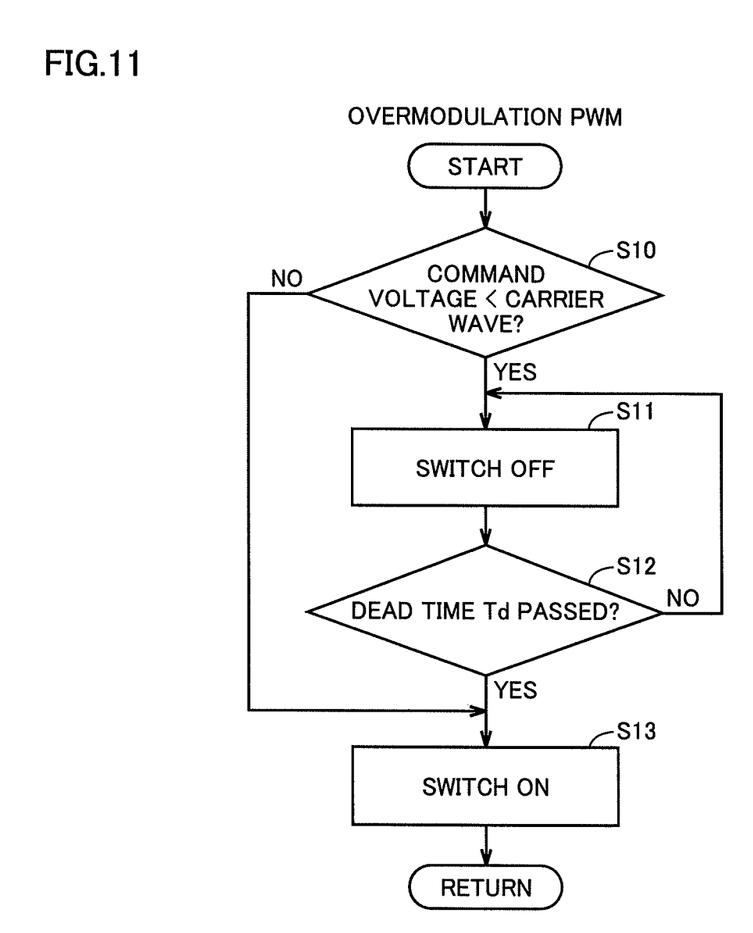
FIG. 11 is a flowchart showing a process procedure by the control device.

FIG. 11 is a flowchart showing a process procedure of control device 30 when setting dead time Td for the overmodulation PWM control.

In a step (hereinafter, the word "step" will be abbreviated as "S") 10, control device 30 determines whether or not the command voltage is lower than the carrier wave.

In the case where the command voltage is lower than the carrier wave (YES in S10), control device 30 proceeds the process to S11 so as to perform the switching-off operation.

In S12, control device 30 reads dead time Td from the memory, and determines whether or not dead time Td has passed since the point of time of the switching-off operation. This dead time Td is a value stored therein and found by finding, through an experiment or the like in advance, a period from a point of time from the point of time of the switching-off operation to the point of time at which the inverter output voltage becomes lower than the control target value "0" as described above.

Until passage of dead time Td (NO in S12), control device 30 brings the process back to S11 so as to continue the switching-off operation.

With the passage of dead time Td (YES in S12), control device 30 proceeds the process to S13 so as to perform the switching-on operation. Accordingly, the switching-on operation is started at the point of time when the inverter output voltage becomes lower than the control target value "0".

As described above, in vehicle 1 according to the present embodiment, in the overmodulation PWM control for inverter 14, the switching-on operation is started at a point of when the inverter output voltage becomes lower than the control target value "0" after the switching-off operation. Accordingly, the peak value of the inverter output voltage in the overmodulation PWM control region can be made low.

It has been illustrated in the present embodiment that as one of specific methods in which the switching-on operation is started at the point of time when the inverter output voltage becomes lower than the control target value "0", dead time Td for the overmodulation PWM control is set in advance at a value that satisfies such a requirement. However, for example, when the vehicle includes a voltage sensor capable of highly accurately detecting the inverter output voltage at a short cycle, the switching-on operation may be started at a point of time when the voltage sensor is employed to actually detect that the inverter output voltage becomes lower than the control target value "0".

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

10: voltage sensor; 10#: direct-current voltage generating unit; 11, 24: current sensor; 12: converter; 14: inverter; 25: rotational angle sensor; 30: control device; 200: PWM control unit; 210: current command generating unit; 220, 250: coordinate conversion unit; 240: voltage command generating unit; 260: PWM modulation unit; 270: dead time setting unit; B: direct-current power source; C0, C1: smoothing capacitor; D1, D2: anti-parallel diode; D1, D2: diode; L1: reactor; M1: alternating-current motor; Q1-Q8: switching element; SR1, SR2: system relay.

The invention claimed is:

1. A vehicle comprising:
a power controller that includes a switching element and that outputs a voltage in accordance with an operation of said switching element; and
a control device that causes the output voltage of said power controller to come close to a control target value by controlling the operation of said switching element in accordance with pulse width modulation control,
wherein, in an overmodulation mode in which a modulation factor is higher than a predetermined value, said control device is configured to determine a point of time after a switching-off operation of said switching element at which said output voltage of said power controller is lower than said control target value, and to start a switching-on operation of said switching element at said point of time, so as to prevent the switching-on operation from starting when the output voltage of said power controller is greater than said control target value.

2. The vehicle according to claim 1, wherein
after the switching-off operation of said switching element, said output voltage has an attenuating waveform that gradually converges toward said control target value, and
in said overmodulation mode, said control device starts the switching-on operation of said switching element at a point of time when said output voltage corresponds to a minimum point of said attenuating waveform after the switching-off operation of said switching element.

3. The vehicle according to claim 1, wherein
said control device starts the switching-on operation of said switching element at a point of time with passage of a predetermined period after the switching-off operation of said switching element, and
in said overmodulation mode, said predetermined period is set in advance to be a period from the point of time of the switching-off operation of said switching element to the point of time when said output voltage becomes lower than said control target value.

4. The vehicle according to claim 1, further comprising a motor, wherein said power controller is an inverter that outputs a voltage to be applied to said motor.

5. A method for controlling a vehicle including a power controller that includes a switching element and that outputs a voltage in accordance with an operation of said switching element, and a control device that causes the output voltage of said power controller to come close to a control target value by controlling the operation of said switching element in accordance with pulse width modulation control, the method comprising the steps of:
performing a switching-off operation of said switching element in an overmodulation mode in which a modulation factor is higher than a predetermined value;
determining that said output voltage of said power controller is lower than said control target value; and
in response to the determining that said output voltage of said power controller is lower than said control target value, starting a switching-on operation of said switching element, so as to prevent the switching-on operation from starting when the output voltage of said power controller is greater than said control target value.

* * * * *